United States Patent
Pangilinan et al.

(10) Patent No.: US 6,660,994 B1
(45) Date of Patent: Dec. 9, 2003

(54) OPTICAL APPARATUS AND METHOD FOR HIGH SPEED MEASUREMENT OF TEMPORALLY-RESOLVED TRANSIENT PRESSURES

(75) Inventors: Gerardo I. Pangilinan, Alexandria, VA (US); Thomas P. Russell, Manassas Park, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 209 days.

(21) Appl. No.: 09/963,948

(22) Filed: Sep. 26, 2001

(51) Int. Cl.$^7$ .......................... G01B 11/16; G01L 23/16
(52) U.S. Cl. .................. 250/227.14; 73/800; 73/705; 385/12; 250/225
(58) Field of Search .......................... 250/225, 227.14, 250/227.16, 227.18; 385/12, 13; 73/655, 705, 820; 356/32, 33, 35.5

(56) References Cited

U.S. PATENT DOCUMENTS

| | | | |
|---|---|---|---|
| 4,492,121 A | 1/1985 | Lehto | 73/705 |
| 4,805,461 A | 2/1989 | Gupta et al. | 73/800 |
| 5,087,124 A | 2/1992 | Smith et al. | 356/358 |
| 5,293,046 A | 3/1994 | Wheatley | 250/458.1 |
| 5,315,364 A | 5/1994 | Arion et al. | 356/32 |
| 5,387,791 A | 2/1995 | Weiss | 250/227.14 |

Primary Examiner—Walter E. Snow
(74) Attorney, Agent, or Firm—Mark Homer

(57) ABSTRACT

An apparatus for measuring pressure in a medium includes a laser for emitting linearly polarized light; a polarizing beam splitter that reflects the linearly polarized light from the laser; a first lens that receives and focuses the linearly polarized light from the polarizing beam splitter; an optical fiber having first and second ends, the first end for receiving the linearly polarized light from the first lens, the second end comprising a tip disposed in the medium, the tip receiving reflected light from the medium, the reflected light being transmitted back through the optical fiber and the first lens to the polarizing beam splitter; the polarizing beam splitter transmitting the reflected light that has polarization orthogonal to the linearly polarized light emitted by the laser but not transmitting the reflected light that has polarization substantially parallel to the linearly polarized light emitted by the laser; a second lens for receiving the reflected light that has polarization orthogonal to the linearly polarized light emitted by the laser; a photodiode for receiving the orthogonal reflected light from the second lens; an oscilloscope connected to the photodiode; and a delay generator connected to the photodiode, the oscilloscope and the laser.

6 Claims, 2 Drawing Sheets

OPTICAL APPARATUS AND METHOD FOR HIGH SPEED MEASUREMENT OF TEMPORALLY-RESOLVED TRANSIENT PRESSURES

STATEMENT OF GOVERNMENT INTEREST

The invention described herein may be manufactured and used by or for the Government of the United States of America for government purposes without the payment of any royalties therefor.

BACKGROUND OF THE INVENTION

The invention relates in general to optical measurement of pressure and in particular to optical measurement of pressure based on the reflectance of the pressurized material.

Some known methods use ruby fluorescence to measure the temporal profile of pressure as a shock traverses a material. Two groups have demonstrated ruby fluorescence as a dynamic pressure gauge (See P. D. Horn, and Y. M. Gupta, *Phys. Rev.* 39, 973 (1989) and G. I. Pangilinan, M. R. Baer, J. Namkung, P. Chambers, and T. P. Russell, *Appl. Phys. Lett.* 77, 684 (2000)).

It is been shown that a sufficient signal can be obtained from the ruby fluorescence. The ruby fluorescence has a property that is related to pressure and can be calibrated at static conditions. The optical character of the ruby sensor is advantageous because it is insulated from strong electromotive forces inherent in triggering most shock applications. These electromotive forces render piezoresistive and piezoelectric gauges, both attractive in measuring shock arrival time and peak amplitude, ineffective.

FIG. 1 shows a known apparatus for measuring the temporal profile of pressure in a shock wave using time-resolved ruby fluorescence spectra. A 2-watt laser 10 operating at 532 nm is used to excite the ruby fluorescence. At this wavelength, the excitation beam is transmitted through a dichroic beam splitter 12 and is focused by a lens 14 into an optical fiber 16. The ruby crystal 18 is epoxied to the end of the fiber 16 and is appropriately placed where the pressure is to be measured. Without lost of generality, the pressure measured is pressure underwater. The ruby fluorescence (at 693 and 694 nm) is collected by fiber 16, reflected by the beam splitter 12 and focused by a lens 19 to a second optical fiber 20. The signal is relayed to a spectrometer 22 by the second optical fiber 20. The spectrometer 22 disperses the signal as a function of wavelength. The collected signal from the spectrometer 22 is further dispersed in time orthogonal to the wavelength dispersion by a streak camera 24 which outputs intensity as a function of two dimensions: wavelength and time.

The streak rate of the camera 24 can be set to provide fast 20 ns pressure data points for up to 0.8 microseconds total. Slower snapshots are readily attainable all with a maximum of 40 data points (nominally twenty data points are obtained from a single measurement). A two dimensional charge-coupled device (CCD) 26 is used to collect and digitize the intensity as a function of wavelength and time. The laser 10, streak camera 24, and CCD 26 are synchronized with the arrival of the shock at the ruby sensor 18 by a delay generator 28.

Examples of the ruby spectra before and during the shock passage are shown in FIG. 2. The shifts of the positions of the ruby fluorescence are used to infer the pressure. The fluorescence yields the pressures as the shock crosses the ruby sensor 18. There are roughly twenty time intervals where pressure is obtained in such an apparatus.

BRIEF SUMMARY OF THE INVENTION

The invention comprises an apparatus for measuring pressure in a medium that includes a laser for emitting linearly polarized light, a polarizing beam splitter that reflects the linearly polarized light from the laser, a first lens that receives and focuses the linearly polarized light from the polarizing beam splitter, and an optical fiber. The first end of the optical fiber receives linearly polarized light from the first lens and the second end of the optical fiber comprises a tip, disposed in the medium, that receives reflected light from the medium. The reflected light is transmitted back through the optical fiber and the first lens to the polarizing beam splitter. The polarizing beam splitter transmits the reflected light that has polarization orthogonal to the linearly polarized light emitted by the laser, but not transmitting the reflected light that has polarization substantially parallel to the linearly polarized light emitted by the laser. The invention also comprises a second lens that receives the reflected light that has polarization orthogonal to the linearly polarized light emitted by the laser. A photodiode that receives the orthogonal reflected light from the second lens. An oscilloscope is connected to the photodiode and a delay generator is connected to the photodiode, the oscilloscope and the laser.

BRIEF DESCRIPTION OF THE DRAWINGS

The invention will be better understood, and further objects, features, and advantages thereof will become more apparent from the following description of the preferred embodiments, taken in conjunction with the accompanying drawings in which.

DETAILED DESCRIPTION OF THE PREFERRED EMBODIMENTS

Figure 1:
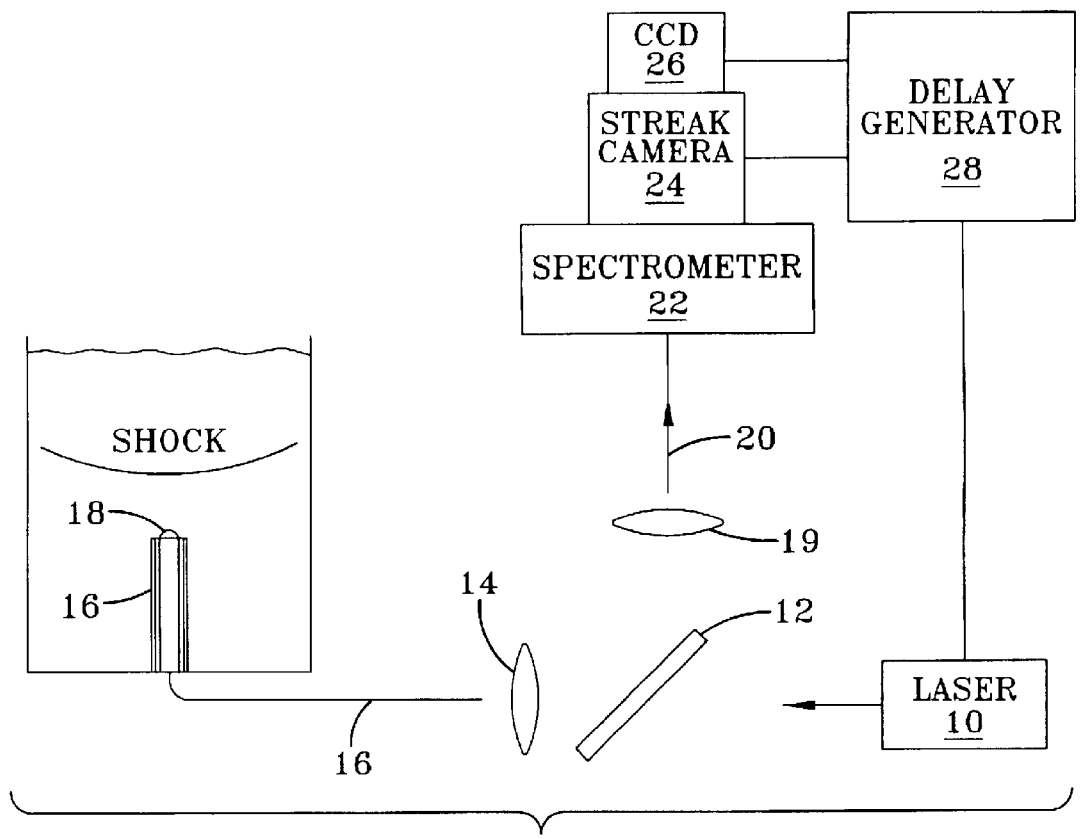
FIG. 1 schematically shows a known apparatus for measuring the temporal profile of pressure in a shock wave using time-resolved ruby fluorescence spectra.
Figure 2:
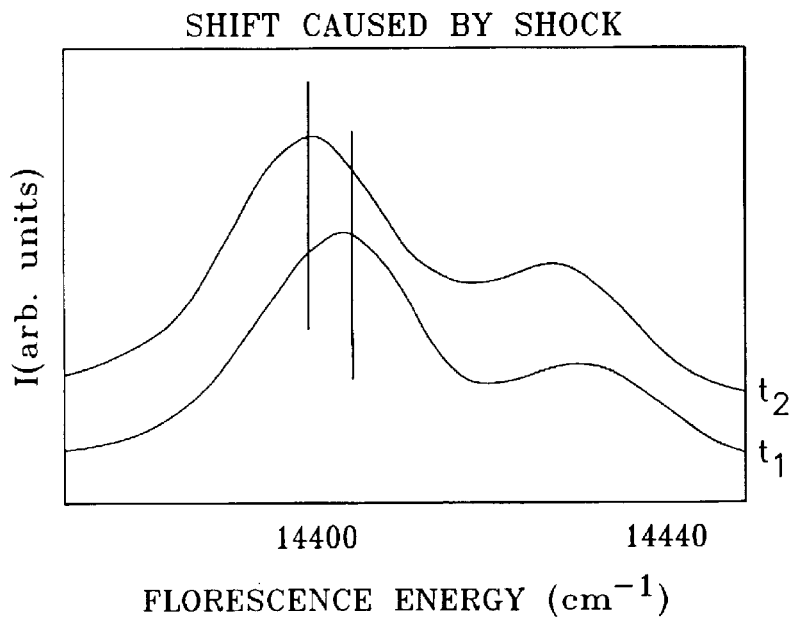
FIG. 2 is an example of the ruby spectra before and during the shock passage.

In the drawings, which are not necessarily to scale, like or corresponding parts are denoted by like or corresponding reference numerals.

Figure 3:
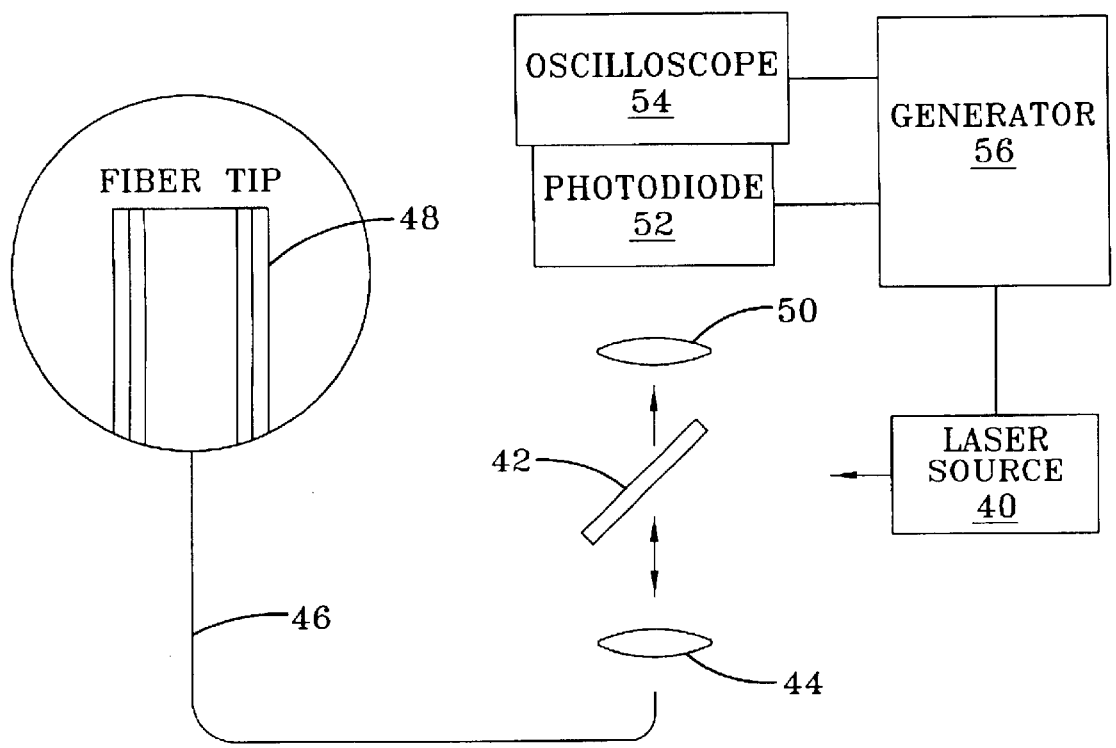
FIG. 3 shows one embodiment of the present invention.

FIG. 3 shows one embodiment of the present invention. A laser source 40 provides the initial linearly polarized beam. Most lasers will have s polarized beams in the geometry shown in FIG. 3. Otherwise, commercially available polarization rotators can be installed to give an s-polarized incident beam. More than 98% of the s-polarized beam is reflected by a polarizing beam splitter 42, and then transmitted through a nonpolarizing optical fiber 46. The pressure-sensing element of the apparatus is the optical fiber tip 48. Most of the incident light in the fiber 46 is transmitted out of the fiber. However, a small percentage is reflected back through the fiber 46. The percentage reflected back through the fiber depends on the geometry of the fiber tip 48, the indices of refraction of the medium (e.g. water) and the wavelength of the laser light. The light reflected back through the fiber 46 is unpolarized.

Figure 4:
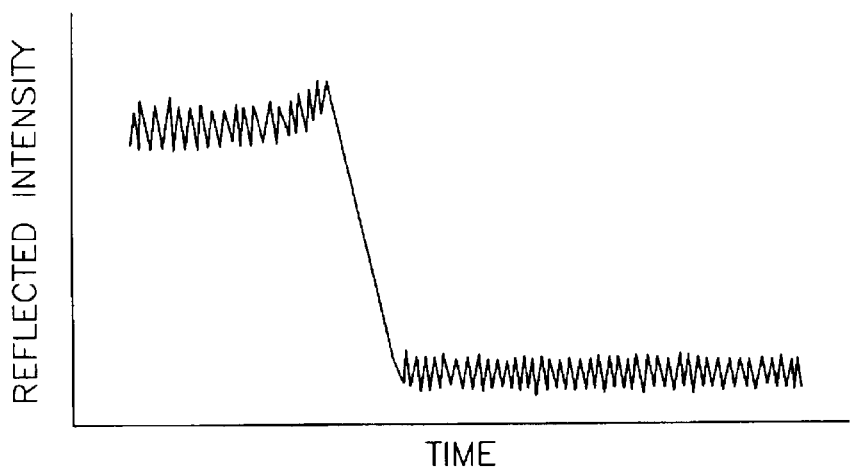
FIG. 4 shows the reflected intensity as a function of time using the apparatus of FIG. 3.

The polarizing beam splitter 42 transmits that part of the light polarized orthogonal to the incident beam onto a fast photodiode 52, which is coupled to a fast oscilloscope 54. The polarizing beam splitter 42 also extinguishes (transmission <0.1%) all s-polarized light characteristic of unwanted scattering from lens 44 and fiber 46. A polaroid analyzer (e.g. Glan Taylor Polarizers) may be inserted between the lens 50 and fast diode 52 to increase extinction of all s-polarized light. A delay unit or generator 56 synchronizes the photodiode 52 and the oscilloscope 54 with the laser 40 to yield a measure of the reflected intensity as a function of time (See FIG. 4).

Pressure is directly related to the reflected intensity values. The reflectance correlates with the index of refraction of the medium (for example, a fluid) which in turn changes according to the pressure. Although this correlation may be obtained by using plane reflection equations, it is very simply measurable. The reflectance can be measured for liquids with different indices of refraction. Finally, literature values that relate material index of refraction with pressure are available (For water, for example, see Yadav et al., J. Appl. Phys. 44, 2197 (1973). In the present invention, the reflectance values correlate with pressure.

The interface between the fiber tip 48 and the medium to be investigated provides the means by which refractive index changes associated with the shock can be measured. The reflected light on that interface will change whenever the index of refraction of the medium is changed by compression. The pressure calibration can either be pursued with literature values or by separate experiments where index of refraction can be tabulated against pressure. As in the use of the ruby crystal as a pressure gauge, the pressure can be obtained from the reflected light values by other static measurements that can include other effects such as temperature.

The collection of the reflected signal from the fiber 46 is obtained using light polarization concepts. This is important because the reflected light from the fiber tip 48 is minimal compared with interfering specular reflection from all other surfaces. Therefore the invention uses a linearly polarized laser 40 and a polarizing beam splitter 42 to select the signal from all other noise. Preferably, the laser 40 emits an s polarized beam. Any specular reflection retains the polarity of the laser beam. The optical fiber 46 scrambles s and p polarizations. Only reflected light that is orthogonal to the laser beam is transmitted by the beam splitter 42 to the second lens 50. For example, if the laser 40 emits an s polarized beam, then only p polarized light will be transmitted to the second lens 50 and thence to the photodiode 52.

The present invention possesses some of the same advantages as the ruby crystal technique:

1) The present invention provides a sufficient signal, i.e. reflectance from the fiber tip 48, that can be measured at fast rates. The reflectance can be readily calibrated to static pressures.
2) A standard method is available to conduct the measurements.
3) The optical method is again immune to electromotive forces.

The present invention also possesses advantages not present in the ruby fluorescence technique:

1) Measurements are much easier to carry out because the signal collected (reflected light) is 5–7 orders of magnitude stronger than ruby fluorescence and is unidirectional. Reflected light is a few percent of the incident light, whereas fluorescence (because of its scattering nature) is 6 to 8 orders of magnitude weaker than the incident light and is divided all over space.
2) The temporal resolution in the present invention is limited only by the speed of the photodiode 52 and the oscilloscope 54, which together can give better than 1 ns resolution. In contrast, high-resolution ruby fluorescence measurements have 20 ns resolution.
3) The spatial resolution in measuring a shock is crucial because the shock inherently is a moving disturbance. The spatial resolution in the present invention is defined by the thickness of the interface. On a flat polished fiber, this is infinitesimal, and is therefor limited only by a few wavelengths of the light used—about 1 micrometer thick for visible light. In contrast, the ruby fluorescence technique has a spatial resolution defined by the thickness of the ruby crystal, which can be 200–400 micrometers in thickness.
4) The total number of time intervals where pressure is measured in the instant invention is defined by the available memory of the oscilloscope 54, which typically is 50,000 points. This is far superior to the ruby fluorescence measurement that is limited severely by constraints inherent in a streak camera.
5) The advantages of 2) and 4) combined enable the present invention to measure long duration shocks that quickly vary in time while the ruby fluorescence method cannot measure such shocks. The ruby fluorescence method must focus on either fast varying changes (and lose information for long time intervals) or measure a long time interval (and lose information on the fast varying changes).
6) The present invention can measure pressures to a tenth of a kilobar or lower. The dynamic range of oscilloscopes is 4096, in contrast to 256 for streak cameras. The ruby fluorescence has an uncertainty of 1 kbar. The present invention can measure lower pressures by simple readjustment of the oscilloscope scale that measures the diode voltage.
7) The present invention is simpler and more straightforward to use. More scientists are better versed with photodiodes and oscilloscopes than with streak cameras and CCDs. The ruby fluorescence method is so intricate that, although there is great demand to measure shocks in time, to the best of applicants' knowledge, only two groups in the world have utilized the ruby fluorescence method since its patenting in the 1980's.
8) The present invention can be adapted to systems where real time variations associated with an index of refraction change. This includes evaluating the nature of effluents, measuring temperatures in exhausts, evaluating lower pressures in medical applications, etc.

While FIG. 3 shows an optical fiber 46 with a flat tip 48, the shape of the tip may be modified. A flat tip will give the highest spatial resolution. However, the effect of the pressure on the reflected beam can be enhanced by changing the tip to another shape, e.g., a hemispherical shape. The nature of the fiber 46 can be changed depending on the expected index of refraction of the medium. For example, sapphire (n=1.77) fibers can be used for fluids where the index of refraction is higher than 1.5. Also, because sapphire is harder than fused silica, it is ideal for studying stronger shocks because sapphire hardly compresses compared with fluids. The shock traversing the fiber would then have negligible effect.

Shocks in solids can be measured by applying a gel material between the fiber tip 48 and the solid. The gel serves as a mechanical contact for the shock to be transmitted. Pressure in the gel is measured. By selecting proper small dimensions, pressure equilibration between the solid and the gel is obtained. The invention can be used in a variety of other applications because of its size and fast response. It is sensitive to the index of refraction of the fluid on the fiber tip's surface. Since the index of refraction is sensitive to the kind of material and the temperature of the material, the invention can also be used to evaluate effluents or measure temperature fluctuations at remote locations.

While the invention has been described with reference to certain preferred embodiments, numerous changes, alterations and modifications to the described embodiments are possible without departing from the spirit and scope of the invention as defined in the appended claims, and equivalents thereof.

What is claimed is:

1. An apparatus for measuring pressure in a medium, comprising:

a laser for emitting linearly polarized light;

a polarizing beam splitter that reflects the linearly polarized light from the laser;

a first lens that receives and focuses the linearly polarized light from the polarizing beam splitter;

an optical fiber having first and second ends, the first end for receiving the linearly polarized light from the first lens, the second end comprising a tip disposed in the medium, the tip receiving reflected light from the medium, the reflected light being transmitted back through the optical fiber and the first lens to the polarizing beam splitter;

the polarizing beam splitter transmitting the reflected light that has polarization orthogonal to the linearly polarized light emitted by the laser but not transmitting the reflected light that has polarization substantially parallel to the linearly polarized light emitted by the laser;

a second lens for receiving the reflected light that has polarization orthogonal to the linearly polarized light emitted by the laser;

a photodiode for receiving the orthogonal reflected light from the second lens;

an oscilloscope connected to the photodiode; and a delay generator connected to the photodiode, the oscilloscope and the laser.

2. The apparatus of claim 1 wherein the linearly polarized light emitted by the laser is s polarized light and the reflected light received by the second lens is p polarized light.

3. The apparatus of claim 1 wherein the optical fiber is a nonpolarizing optical fiber.

4. The apparatus of claim 3 wherein the optical fiber comprises one of sapphire and fused silica.

5. The apparatus of claim 1 wherein the medium is one of a liquid and a gas.

6. The apparatus of claim 1 wherein the medium comprises a gel for transmitting pressure from a solid.

* * * * *